Dec. 13, 1955  R. R. PULLEN  2,726,478
KILLY, EEL AND CHUM POT
Filed April 27, 1953
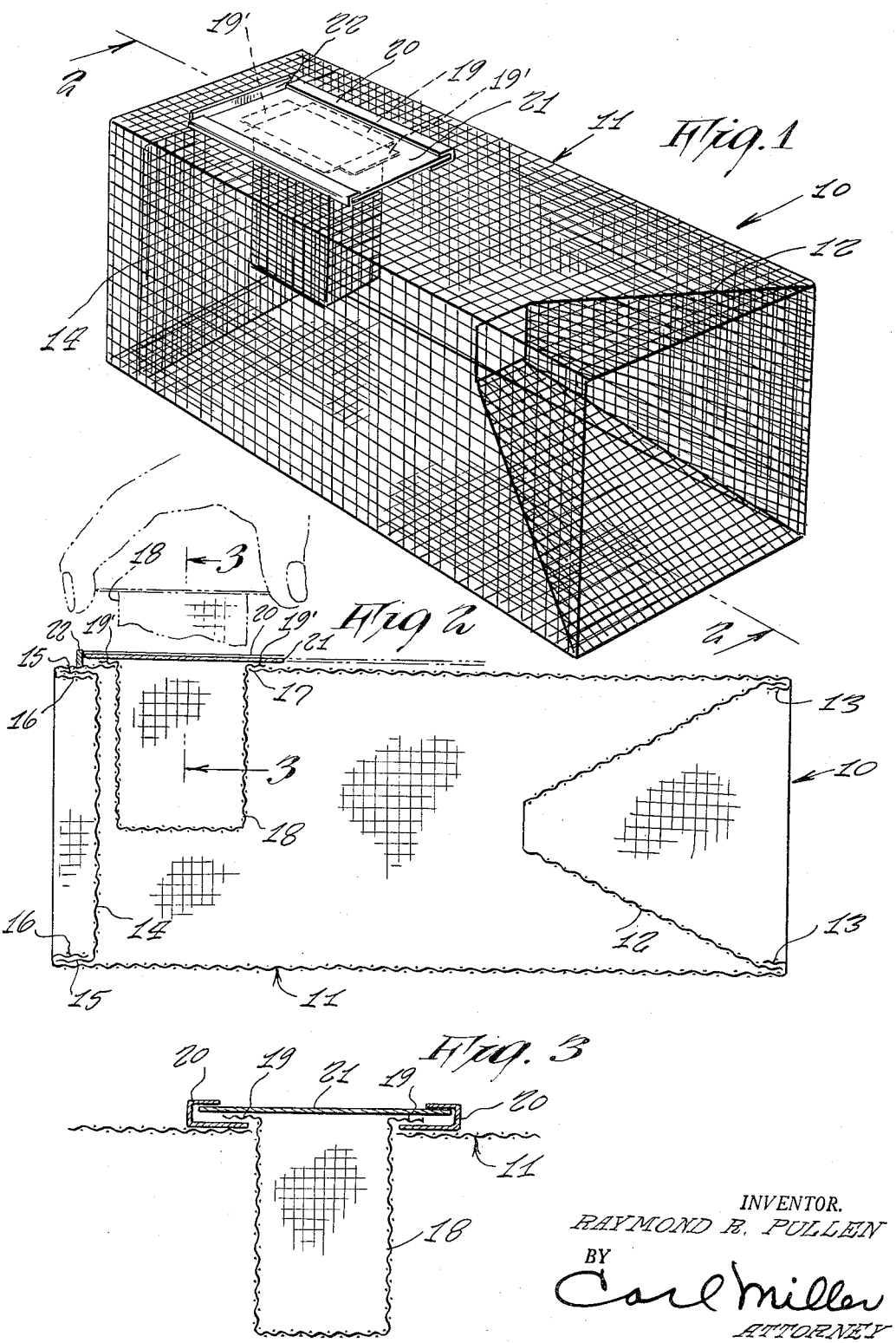
INVENTOR.
RAYMOND R. PULLEN
BY
Carl Miller
ATTORNEY

United States Patent Office 2,726,478
Patented Dec. 13, 1955

2,726,478

KILLY, EEL AND CHUM POT

Raymond R. Pullen, Rumson, N. J.

Application April 27, 1953, Serial No. 351,366

1 Claim. (Cl. 43—100)

This invention relates to fish traps.

It is an object of the present invention to provide a killy, eel and chum pot or fish trap formed entirely of wire mesh and having a removable bait basket formed of mesh wire.

It is another object of the present invention to provide a fish trap of the above type wherein means are provided for retaining the bait basket in place, yet permitting its quick and ready removal when desired.

Other objects of the present invention are to provide a killy, eel and chum pot bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Figure 1 is a perspective view of the invention;

Fig. 2 is a longitudinal sectional view taken along the line 2—2 of Fig. 1 and

Fig. 3 is a vertical sectional view taken along the line 3—3 of Fig. 2.

Referring now to the figures in which similar reference numerals identify corresponding parts throughout the several views, there is shown a killy, eel and chum pot, referred to collectively as 10, and including a rectangular frame 11 of mesh wire substantially as illustrated.

A frustro-pyramidal funnel 12 of mesh wire fits in one end of the pot 11, the ends of the pot 11 being folded in as at 13, around the edge of the funnel 12 (Fig. 2), forming a rim which reinforces and strengthens the pot. The narrow end of funnel 12 is disposed within the pot or frame 11.

A closure 14 of wire mesh is provided for the other end of the pot 11, the edges of closure 14 being bent outwardly as at 15 and being secured by the ends of the pot 11 bent inwardly as at 16, forming a rim which reinforces and strengthens the pot.

The top of pot 11 adjacent closure 14 is provided with an opening 17 which receives a bait basket 18 of wire mesh, the upper edges of bait basket 18 being provided with pairs of laterally extending flanges 19, 19' which engage the pot 11 surrounding the opening 17 wherein the bait basket is supported in an obvious manner.

A pair of channel shaped members of substantially J-shape in cross section are secured to the top of pot 11 along the longitudinal sides of opening 17 and adapted to receive one pair of the flanges 19, cooperating with each other to slidably receive a cover 21, the channel shaped members being designated by the number 20. A stop 22 is secured to the top of pot 11 and connects the ends of channel shaped members 20 and abuts the sliding cover 21.

Thus, the cover 21 holds the bait basket 19 in a firm position on each side of the hatch 17 and locks the basket in place. The cover slides up as far as the stop 22.

In setting the pot, pull off the slide 21, take out bait basket 18 and fill with bait. Set the basket back in hatch 17, slide on cover 21 and the pot 10 is then ready to set. Fasten rope and cork on pot so that it can be easily located and picked up.

When ready to empty the contents, remove cover 21, take out bait basket 18 by means of the other pair of flanges 19' which constitute finger engaging means to facilitate removal of said basket and up-end pot 10 and empty out the killies. The killies cannot get the bait out of the basket as it is separated from them. By this method the killies are kept clean and the bait may be reused several times.

The pot can also be used for chumming for top fishing. Fill the pot with chum (bait basket should be removed) and tie to the side of the boat so that the pot will be even with the top of the water. Pulling the rope on the pot up and down occasionally will allow the chum to seep out of the pot and attract the fish.

For bottom fishing, fill pot with bait, put some weight in the pot so it will hold on the bottom in a strong tide, tie to side of boat and allow enough rope for the pot to hold on the bottom.

While various changes may be made in the detail construction, such changes shall be within the spirit and scope of the present invention as defined by the appended claim.

Having thus set forth and disclosed the nature of my invention, what is claimed is:

A fish trap comprising a rectangular frame of wire mesh open at both ends, a funnel of wire mesh disposed within one open end of said frame with the neck of said funnel disposed inwardly, the end of said frame being bent inwardly around the wide mouth of said funnel to secure the same in position and to provide a reinforced edge, a wire mesh closure within the other end of said frame and the other end of said frame being bent inwardly and said wire mesh closure having an outwardly extending edge secured by the said last mentioned inwardly bent end of said frame, the top of said frame having a hatch opening intermediate said funnel and closure, a wire mesh bait basket disposed within said opening, the upper edges of said bait basket being provided with pairs of laterally extending flanges, a pair of track members secured to opposite sides of said hatch opening and cooperating with each other to slidably receive one pair of the upper flanges of said bait basket and a flat plate which secures said basket in position, and a stop secured to the top of said frame and connecting the ends of said track members and adapted to abut the end of said plate, the remaining pair of flanges constituting finger engaging means to facilitate removal of the basket from the frame.

References Cited in the file of this patent

UNITED STATES PATENTS

| | | |
|---|---|---|
| 158,623 | Burtis | Jan. 12, 1875 |
| 427,049 | Cochennour | May 6, 1890 |
| 731,398 | Watson | June 16, 1903 |
| 1,013,320 | Schmidt | Jan. 2, 1912 |
| 1,474,087 | Prime | Nov. 13, 1923 |
| 2,137,739 | Gatch | Nov. 22, 1938 |
| 2,516,658 | Stelly | July 25, 1950 |
| 2,589,360 | Ferguson | Mar. 18, 1952 |